United States Patent
Rosedale

(10) Patent No.: US 11,175,728 B2
(45) Date of Patent: Nov. 16, 2021

(54) ENABLING NEGATIVE REPUTATION SUBMISSIONS IN MANNERS THAT REDUCE CHANCES OF RETALIATION

(71) Applicant: High Fidelity, Inc., San Francisco, CA (US)

(72) Inventor: Philip Rosedale, San Francisco, CA (US)

(73) Assignee: High Fidelity, Inc., San Francisco, CA (US)

( * ) Notice: Subject to any disclaimer, the term of this patent is extended or adjusted under 35 U.S.C. 154(b) by 429 days.

(21) Appl. No.: 16/269,278

(22) Filed: Feb. 6, 2019

(65) Prior Publication Data

US 2020/0250339 A1 Aug. 6, 2020

(51) Int. Cl.
*G06F 3/00* (2006.01)
*G06F 3/01* (2006.01)
*G06T 19/00* (2011.01)
*G06T 13/40* (2011.01)
*H04L 9/00* (2006.01)
*H04L 9/06* (2006.01)
(Continued)

(52) U.S. Cl.
CPC .............. *G06F 3/011* (2013.01); *G06F 3/012* (2013.01); *G06T 13/40* (2013.01); *G06T 19/006* (2013.01); *H04L 9/006* (2013.01); *H04L 9/0643* (2013.01); *H04L 12/1822* (2013.01); *H04L 63/00* (2013.01); *H04N 7/15* (2013.01); *A63F 2300/8082* (2013.01); *G06F 3/04842* (2013.01); *G06F 21/6254* (2013.01); *H04L 12/1813* (2013.01); *H04L 67/22* (2013.01); *H04L 2209/38* (2013.01)

(58) Field of Classification Search
CPC ........ G06F 3/0482; G06F 3/011; G06F 3/012; G06F 21/6254; G06T 13/40; G06T 19/006; H04L 9/006; H04L 9/0643; H04L 12/1822; H04L 63/00; H04L 12/1813; H04L 67/22; H04L 2209/38; H04N 7/15; A63F 2300/8082
See application file for complete search history.

(56) References Cited

U.S. PATENT DOCUMENTS 7,119,819 B1 * 10/2006 Robertson ........... G06F 3/04815
                                                            715/782
7,542,040 B2 * 6/2009 Templeman ............ G06F 3/011
                                                            345/474
(Continued)

OTHER PUBLICATIONS

Wikipedia, "Ring Signature," downloaded from https://en/wikipedia/org/wiki/Ring_signature on Feb. 4, 2019, 5 pages.

*Primary Examiner* — Nicholas Augustine
(74) *Attorney, Agent, or Firm* — Vierra Magen Marcus LLP

(57) ABSTRACT

Certain technology disclosed herein relates to a server, that supports a portion of a computer implemented virtual reality (VR) environment, submitting negative reports on behalf of users in order to reduce the probability of users of the VR environment retaliating against one another in response to receiving negative ratings. Certain technology described herein relates to using ring signatures to sign the negative reports that are to be submitted to a public database, which technology is also used to reduce the probability of users retaliating against one another in response to receiving negative ratings.

20 Claims, 5 Drawing Sheets

(51) Int. Cl.
  *H04L 12/18* (2006.01)
  *H04N 7/15* (2006.01)
  *H04L 29/06* (2006.01)
  *G06F 21/62* (2013.01)
  *H04L 29/08* (2006.01)
  *G06F 3/0484* (2013.01)

(56) References Cited

U.S. PATENT DOCUMENTS

| | | | |
|---|---|---|---|
| 7,877,353 B2 | 1/2011 | Ahmed et al. | |
| 9,244,533 B2* | 1/2016 | Friend | G06F 3/017 |
| 9,363,283 B1 | 6/2016 | Herrera-Yague et al. | |
| 9,385,869 B1 | 7/2016 | Satish et al. | |
| 9,696,795 B2* | 7/2017 | Marcolina | G06T 19/006 |
| 9,996,797 B1* | 6/2018 | Holz | G06F 3/04842 |
| 10,185,480 B1 | 1/2019 | Kuo et al. | |
| 10,516,853 B1* | 12/2019 | Gibson | G06T 7/73 |
| 2012/0249741 A1* | 10/2012 | Maciocci | G06T 15/503 348/46 |
| 2013/0194259 A1 | 8/2013 | Bennett et al. | |
| 2014/0082526 A1* | 3/2014 | Park | H04L 67/38 715/757 |
| 2014/0282105 A1* | 9/2014 | Nordstrom | G09B 19/003 715/753 |
| 2014/0344718 A1 | 11/2014 | Rapaport et al. | |
| 2015/0215351 A1 | 7/2015 | Barzuza et al. | |
| 2016/0357261 A1 | 12/2016 | Bristol et al. | |
| 2017/0185261 A1* | 6/2017 | Perez | G06F 3/04815 |
| 2018/0095616 A1* | 4/2018 | Valdivia | G06F 3/013 |
| 2018/0131907 A1* | 5/2018 | Schmirler | G05B 23/0216 |
| 2018/0357472 A1* | 12/2018 | Dreessen | G06T 3/60 |
| 2019/0087015 A1* | 3/2019 | Lam | G06F 1/1686 |
| 2019/0303807 A1* | 10/2019 | Gueye | G06Q 10/02 |
| 2020/0065802 A1* | 2/2020 | Mathieson | H04L 9/0637 |
| 2020/0110928 A1* | 4/2020 | Al Jazaery | G06K 9/00335 |
| 2020/0117267 A1* | 4/2020 | Gibson | G06T 15/20 |
| 2020/0117270 A1* | 4/2020 | Gibson | G06T 17/00 |
| 2020/0153627 A1* | 5/2020 | Wentz | H04L 9/3218 |
| 2021/0008413 A1* | 1/2021 | Asikainen | G06F 3/011 |
| 2021/0041951 A1* | 2/2021 | Gibson | G06F 3/012 |

* cited by examiner

ENABLING NEGATIVE REPUTATION SUBMISSIONS IN MANNERS THAT REDUCE CHANCES OF RETALIATION

FIELD OF THE INVENTION

Embodiments of the present invention generally relate to multi-user computer implemented virtual reality (VR) environments, and more particularly to systems and methods that enable the generation of reputation scores within VR environments, as well as to access and use of such reputation scores within VR environments.

BACKGROUND

In multi-user computer implemented virtual reality (VR) environments it is often desirable for people to use identities (aka Avatars) that are not tied to their real-world identities. This is one of the main allures of multi-user computer implemented VR environments, which are often referred to herein more succinctly as VR environments. Additionally, because VR environments are global, an individual that explores or otherwise participates in a VR environment is likely to meet many other people (each represented by respective Avatar) that the individual does not know in the real world. According, it is often difficult for an individual (aka a user) that is participating in a VR environment to determine whether they should have certain interactions with other individuals (i.e., other users) within the VR environment, because the individual may not know whether the other individuals are trustworthy. Exemplary interactions that a user within a VR environment may have with another user of the VR environment includes: performing a financial transaction with the other user; allowing the other user to enter a secure area (e.g., a virtual home or virtual store) or event (e.g., a virtual meeting, virtual party, or virtual conference); and granting the other user permission to edit a portion of a VR environment; just to name a few. This may cause a user within a VR environment to be unwilling to interact with other users that the user does not already know in the real world, or may result in a user having a bad experience within the VR environment. For example, another user may promise to perform a task or deliver a virtual good in exchange for a payment, but after being paid the other user may not actual perform the task or deliver the virtual good. Similarly, a user may perform a task or deliver a virtual good to another user, but after performing the task or delivering the virtual good may not receive a promised payment or service from the other user. For another example, a second user that is granting permission to edit a portion of a VR environment created by a first user may delete, vandalize or otherwise ruin a portion of the VR environment created by the first user. For still another example, a user granted access to a virtual event may nefariously utilize a virus or an overtly complex to render virtual element in order to cause software applications to crash or slow to a crawl. In view of the above, it would be beneficial if there were ways in which users of VR environments can determine whether other users should be trusted.

SUMMARY

Various embodiments of the present technology are related to methods, systems, and sub-systems (e.g., servers) for use with a computer implemented virtual reality (VR) environment in which users can explore the VR environment and interact with one another within the VR environment using client computing devices that are being used by the users.

Certain embodiments of the present technology are related to methods for use by a server that supports a portion of a computer implemented VR environment in which a plurality of users can interact with one another using respective avatars controlled by the users using respective computing devices. Such a method can include the server receiving a negative report that a first user controlling a first avatar within a portion of the VR environment generated about a second user controlling a second avatar within the portion of the VR environment. The method also includes the server confirming that the first and second avatars, controlled respectively by the first and second users, were both in the portion of the VR environment being supported by the server when the negative report about the second user was generated by the first user. The method further includes the server submitting the negative report about the second user, on behalf of the first user, to a publicly accessible database that stores reputation information for users of the VR environment. In such embodiments, because the server submits the negative report about the second user to the publicly accessible database, on behalf of the first user, the second user cannot determine from the publicly accessible database that the first user generated the negative report about the second user, and thus, a probability that the second user will retaliate against the first user is reduced compared to if the second user were able to determine from the publicly accessible database that the first user generated the negative report about the second user.

In accordance with certain embodiments, each of the users is associated with a respective public key and a respective private key. The server is provided with or otherwise receives the public key of each of the users whose avatar is within the portion of the VR environment being supported by the server. Further, the server uses the public keys of the first and second users to confirm that the first and second avatars, controlled respectively by the first and second users, were both in the portion of the VR environment being supported by the server when the negative report about the second user was generated by the first user. More generally, each of the users is associated with respective a unique identifier, the server is provided with or otherwise receives the unique identifier of each of the users whose avatar is within the portion of the VR environment being supported by the server, and the server uses the unique identifiers of the first and second users to confirm that the first and second avatars, controlled respectively by the first and second users, were both in the portion of the VR environment being supported by the server when the negative report about the second user was generated by the first user. One type of unique identify is a public key. Another example of a unique identifier is an alphanumeric password generated by a user. Other variations are also possible.

In accordance with certain embodiments, the negative report about the second user that is generated by the first user is used to adjust a reputation score of the second user that is made available to other users.

In accordance with certain embodiments, the public database, which stores reputation information for users of the VR environment, is stored in a blockchain.

Certain embodiments of the present technology are related to a server that supports a computer implemented VR environment in which users of the VR environment can explore the VR environment and interact with one another within the VR environment using client computing devices that are being used by the users. Such a server can include a network interface and one or more processors. The network interface of the server can be configured to receive a negative report that a first user controlling a first avatar within a portion of the VR environment generated about a second user controlling a second avatar within the portion of the VR environment. The one or more processors of the server can be configured to confirm that the first and second avatars, controlled respectively by the first and second users, were both in the portion of the VR environment being supported by the server when the negative report about the second user was generated by the first user. Additionally, the one or more processors of the server can also be configured to submit the negative report about the second user, on behalf of the first user, to a publicly accessible database that stores reputation information for users of the VR environment. Because the server submits the negative report about the second user to the publicly accessible database, on behalf of the first user, the second user cannot determine from the publicly accessible database that the first user generated the negative report about the second user, and thus, a probability that the second user will retaliate against the first user is reduced compared to if the second user were able to determine from the publicly accessible database that the first user generated the negative report about the second user.

Certain embodiments of the present technology are related to further methods for use with a computer implemented VR environment in which users can interact with one another using respective avatars controlled by the users using respective computing devices. Such a method can include computing a ring signature for a group of the users associated with avatars that are within a portion of the VR environment. The method can also include receiving a negative report that a first user controlling a first avatar within the portion of the VR environment generated about a second user controlling a second avatar within the portion of the VR environment. Further, the method can include signing the negative report about the second user with the ring signature, and submitting the negative report about the second user, which has been signed with the ring signature, to a publicly accessible database that stores reputation information for users of the VR environment. Because the negative report about the second user, as submitted to the publicly accessible database is signed with the ring signature, the second user cannot determine from the publicly accessible database that the first user generated the negative report, and thus, a probability that the second user will retaliate against the first user is reduced compared to if the second user were able to determine from the publicly accessible database that the first user generated and/or signed the negative report.

In accordance with certain embodiments, each of the users is associated with a respective public key and a respective private key, and the ring signature is computed using the private key of the first user and the public keys of other members of the group of the users associated with avatars that are within the portion of the VR environment. Other variations are also possible and within the scope of the embodiments described herein.

In accordance with certain embodiments, a server, which supports the portion of the VR environment, determines whether the first and second avatars, controlled respectively by the first and second users, were both in the portion of the VR environment being supported by the server when the negative report about the second user was generated by the first user. In such embodiments, the server can allow the negative report about the second user to be signed with the ring signature and submitted to the publicly accessible database, in response to the server determining that the first and second avatars, controlled respectively by the first and second users, were both in the portion of the VR environment being supported by the server when the negative report about the second user was generated by the first user. Conversely, the server can prevent the negative report about the second user from being signed with the ring signature and submitted to the publicly accessible database, in response to the server determining that the first and second avatars, controlled respectively by the first and second users, were not both in the portion of the VR environment being supported by the server when the negative report about the second user was generated by the first user. In accordance with certain embodiments, the negative report about the second user that is generated by the first user is used to adjust a reputation score of the second user that is made available to other users. In accordance with certain embodiments, the public database, which stores reputation information for users of the VR environment, is stored in a blockchain.

A server, accordance to certain embodiments of the present technology, includes a network interface and one or more processors. The one or more processors of the server is/are configured to compute ring signature for a group of the users associated with avatars that are within a portion of the VR environment. The network interface of the server is configured to receive a negative report that a first user controlling a first avatar within a portion of the VR environment generated about a second user controlling a second avatar within the portion of the VR environment. The one or more processors of the server is/are also configured to sign the negative report about the second user with the ring signature, and submit the negative report about the second user, which has been signed with the ring signature, to a publicly accessible database that stores reputation information for users of the VR environment. Because the negative report about the second user, as submitted to the publicly accessible database is signed with the ring signature, the second user cannot determine from the publicly accessible database that the first user generated the negative report, and thus, a probability that the second user will retaliate against the first user is reduced compared to if the second user were able to determine from the publicly accessible database that the first user generated and/or signed the negative report.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure.

DETAILED DESCRIPTION

Figure 1:
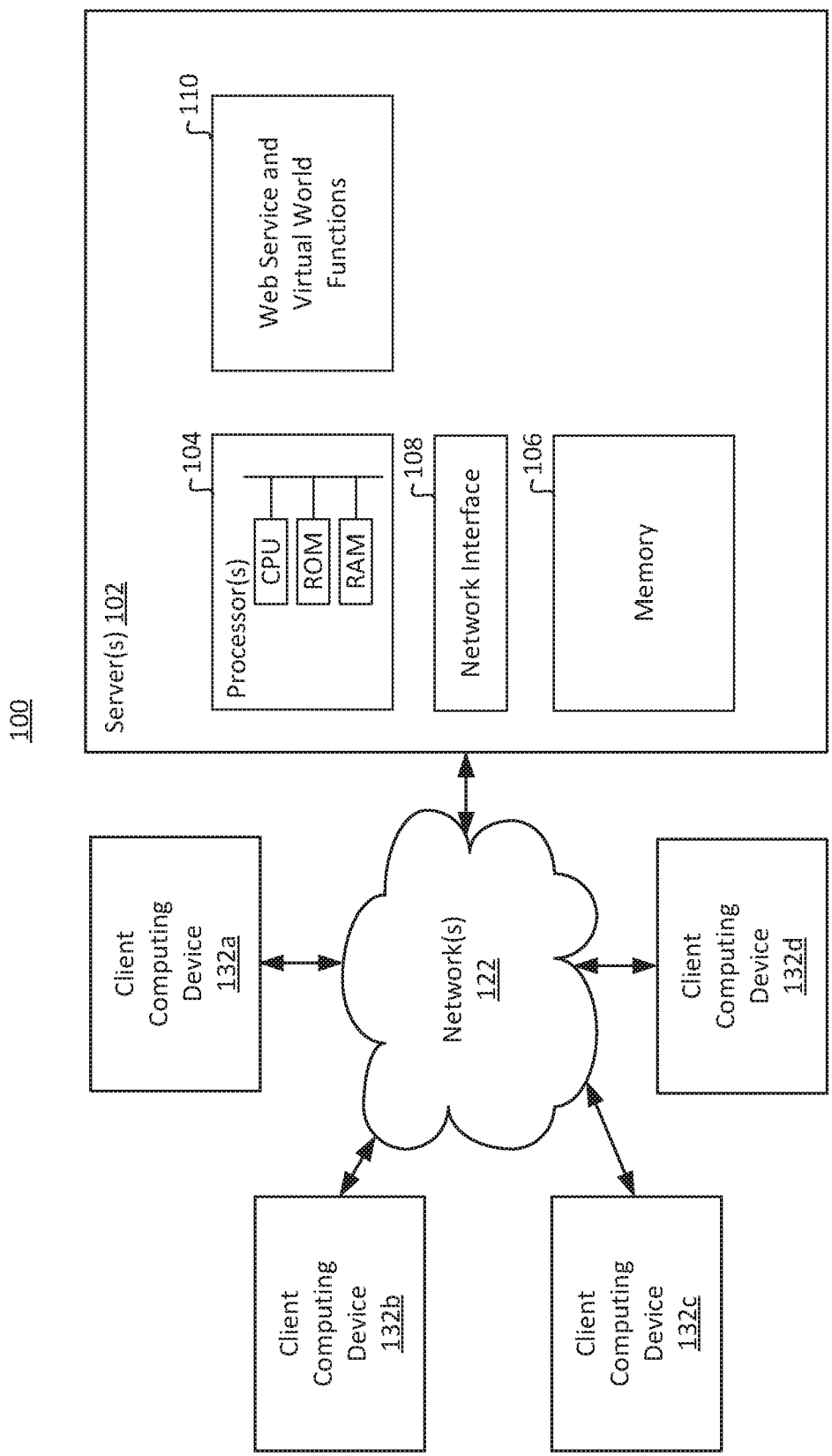
FIG. 1 is a high level block diagram of various components of an exemplary system with which embodiments of the present technology may be used.

The following description is of various embodiments of the present technology. The description is not to be taken in a limiting sense but is made merely for the purpose of describing the general principles of the technology. The scope of the technology should be ascertained with reference to the claims. In the description of the embodiments of the present technology that follows, like numerals or reference designators will be used to refer to like parts or elements throughout.

For various reasons, as noted above in the Background, it would be beneficial if there were ways in which users of VR environments can determine whether other users should be trusted. In order to enable users of VR environments to be able to determine whether other users should be trusted, reputation scores can be assigned to individual users and shared with other users. This enables a user to determine, based on another user's reputation score, whether the user should trust the other user.

A particular user's reputation score can, for example, be based on ratings of the particular user that are submitted by other users with which the particular user has interacted. One user can rate another user in various different manners. For example, a user can utilize a user interface to enter a rating indicative of the user's impression of another user. Such a rating, which can also be referred to as a reputation score, can be a numeric value within a specified range, e.g., from 0 to 1, from 0 to 4, from 1 to 4, from 0 to 10, from 1 to 10, from 0 to 100, or from 1 to 100, but not limited thereto. Reputation scores or ratings need not be numeric values, but can instead be indicated by a quantity of symbols, such as stars, smiley faces, or the like. Ratings can be positive in nature or negative in nature, or potentially neutral in nature, depending on the specific way in which ratings are submitted. For an example, a rating can be binary in nature, such as: a thumbs up for a positive rating and a thumbs down for a negative rating; a "like" for a positive rating and a "dislike" for a negative rating; a smiley face for a positive rating and a frowning face for a negative rating, just to name a few. Depending upon the scale or range, certain numeric rating values can be considered a negative rating while others are considered a positive rating. For example, if a rating scale is from 1 to 4, a rating of 1 can be considered a negative rating, a rating of 2 can be considered neutral, and a rating of 3 or 4 can be considered a positive rating. Other variations are also possible.

A user can enter a rating for another user using a certain button or combination of buttons being pressed, or using a pulldown menu, or the like. It would also be possible for a user to rate another user using gestures. For example, a first user can make a positive gesture, such as nodding, towards a second user that indicates that the first user has a positive impression of the second user. Besides nodding, other exemplary types of positive gestures include, but are not limited to, thumbs up, hand shaking, clapping, and waving. A first user can alternatively make a negative gesture towards a second user that indicates that the first user has a negative impression of the second user. The negative gesture can be, e.g., shaking their head side to side, or a thumbs down, but is not limited thereto. A reputation score can thus be assigned to a user, or modified, based on whether another user has a positive impression of the other user as determining based on the gesture information.

A second user will typically appreciate if a first user provides them with a positive rating, which may be used to increase the reputation score for the second user, which can also be referred to as the rating for the second user. Conversely, a second user will typically not appreciate if a first user provides them with a negative rating, which may be used to decrease the reputation score for the second user. Indeed, some users may want to retaliate against other users that provide them with negative ratings. For example, if a second user knows that a first user gave them a negative rating (even though justified), the second user may in-turn give the first user a negative rating and/or have numerous friends give the first user a negative rating (event though not justified). For a more specific example, the second user may give the first user a negative rating because the first user did not perform a job they were paid to perform, or because the first user did a poor job. The second user, if sophisticated, can learn (e.g., by observing a public database where reputation scores and transactions are stored) that the first user gave them the negative rating and may retaliate against the first user for no other reason than the first user having given them a justified negative rating. This can have the chilling effect of causing users of a VR environment to not give other users justified negative ratings because they are afraid of being retaliated against. This will have the adverse effect of making reputation scores for users of the VR environment less informative and reliable, and thus, not as trustworthy. Certain embodiments of the present technology, described below, can be used to reduce a probability that a second user will retaliate against a first user, thereby reducing the above described potential chilling effect. However, prior to providing additional details of such embodiments (that can be used to reduce the probability of retaliation to negative ratings occurring), exemplary systems and devices that can be used to implement such embodiments will first be described with reference to FIGS. 1 and 2.

FIG. 1 shows a configuration of a system 100 having one or more servers 102 and multiple client computing devices 132a, 132b, 132c, 132d, which are interconnected via one or more networks 122 including, but not limited to, the Internet, a local area network (LAN), a wide area network (WAN), a virtual private network (VPN), or any other network or combination of networks. Such networks, or portions thereof, can be wired, wireless, optical, etc. Embodiments of the present technology are not tied to any particular type of network. Rather, what is important is that the various components, or at least a subset of the various components, can communicate as described herein.

The one or more servers 102 can have a Web server function and a virtual world server function 110, as well as other functions, some of which are discussed below. Each server 102 can include one or more processors 104, memory 106, a network interface 108, as well as many other components. Each processor 104 can include a central processing unit (CPU), read only memory (ROM), and random access memory (RAM), as well as many other components. The network interface 108 can be used, e.g., to receive requests and reports from the client computing devices 132, as well as to response to such requests and/or reports. A server 102 can further have a plurality of server functions that are implemented in the form of application programs stored in the memory 106. The plurality of server functions can include the Web server function and the virtual world server function, represented by block 110, which are implemented using the processor(s) 104.

The memory 106 can include volatile and/or nonvolatile memory such as read only memory (ROM) and random access memory (RAM). The memory 106 can store, e.g., a basic input/output system (BIOS), data and/or program modules that are immediately accessible by the processor(s) 104. The memory 106 can also store an operating system, application programs, other program modules, and program data. A server 102 can also include and/or be coupled to other removable/non-removable, volatile/nonvolatile computer storage media, such as, but not limited to, a hard disk drive, nonvolatile magnetic media, a magnetic disk drive, and an optical disk drive that reads from or writes to a removable, nonvolatile optical disk such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like.

The client computing devices 132*a*, 132*b*, 132*c*, 132*d*, etc., can be referred to collectively as the client computing devices 132, or individually as a client computing device 132. Each client computing device 132 (hereinafter often referred to more succinctly as a client device, or simply a client) can comprise a computing device that enables a user of the client device 132 to communicate with the server(s) 102 and/or one or more other client device(s) 132 so that the user can explore a VR environment that is supported by the server(s) 102 and/or client devices 132 and interact with avatars of other users within the VR environment.

Figure 2:
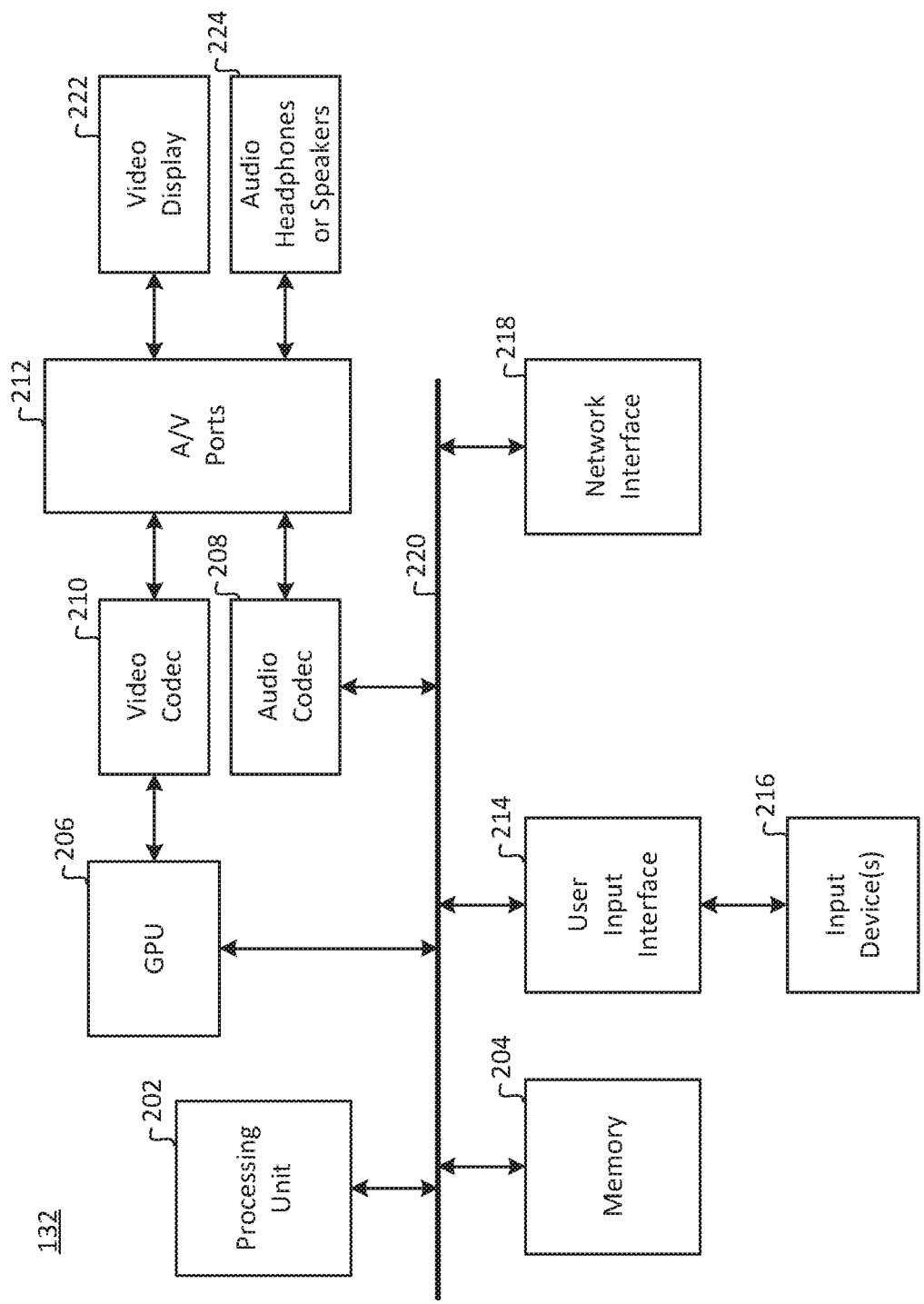
FIG. 2 schematically illustrates exemplary details of a computing device that can operate as an interactive client computing device in the system of FIG. 1.

One or more client devices 132 can be implemented as, or be connected to, a head mounted display (HMD) device that can be used to detect the orientation of a user's head, track a user's eye gaze, accept audio inputs from a user, display VR environments to a user, output stereo audio to a user, and/or the like. Exemplary HMD devices include the Oculus Rift available from Oculus VR, Inc. (headquartered in Menlo Park, Calif.), the HTC Vive available from HTC Corporation (headquartered in New Taipei City, Taiwan), and the Samsung Gear VR available from Samsung (headquartered in Seoul, Korea), just to name a few. A client device 132 can alternatively be a desktop computer, a laptop computer, a tablet computer, a smartphone, a gaming computer, or the like. FIG. 2 schematically illustrates exemplary details of an exemplary client device 132.

Referring to FIG. 2, the client device 132 shown therein includes one or more processing units 202 (which can also be referred to as processors), memory 204, a graphical processing unit (GPU) 206, an audio codec 208, a video codec 210, audio/visual (A/V) ports 212, a user input interface 214, input device(s) 216, a network interface 218 and a bus 220. The network interface 218 can be used, e.g., to send requests and reports to the server 102, as well as to receive responses to such requests and/or reports. The client device 132 shown in FIG. 2 is only one example of a suitable client device and is not intended to suggest any limitation as to the scope of use or functionality of the presently disclosed subject matter. Neither should the client device 132 be interpreted as having any dependency or requirement relating to any one or combination of components illustrated in the exemplary client device 132. In some embodiments the various depicted computing elements may include circuitry configured to instantiate specific aspects of the present disclosure. For example, the term circuitry used in the disclosure can include specialized hardware components configured to perform function(s) by firmware or switches. In other exemplary embodiments the term circuitry can include a general purpose processing unit, memory, etc., configured by software instructions that embody logic operable to perform function(s). In example embodiments where circuitry includes a combination of hardware and software, an implementer may write source code embodying logic and the source code can be compiled into machine readable code that can be processed by a general purpose processing unit. Since one skilled in the art can appreciate that the state of the art has evolved to a point where there is little difference between hardware, software, or a combination of hardware/software, the selection of hardware versus software to effectuate specific functions is a design choice left to an implementer. More specifically, one of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer.

The client device 132 can includes a variety of computer readable media. Computer readable media can be any available media that can be accessed by the client device 132 and includes both volatile and nonvolatile media, removable and non-removable media. Such computer readable media is generally represented by the memory 204, which can include volatile and/or nonvolatile memory such as read only memory (ROM) and random access memory (RAM). The memory 204 can store, e.g., a basic input/output system (BIOS), data and/or program modules that are immediately accessible the processing unit 202. The memory 204 can also store an operating system, application programs, other program modules, and program data. The client device 132 can also include other removable/non-removable, volatile/nonvolatile computer storage media, such as, but not limited to, a hard disk drive, nonvolatile magnetic media, a magnetic disk drive, and an optical disk drive that reads from or writes to a removable, nonvolatile optical disk such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like.

A user may enter commands and information into the client device 132 through input device(s) 216 such as a keyboard and/or a pointing device, such as a mouse, trackball or touch pad. Such command can be used, e.g., to control an avatar in a VR environment. Other exemplary input devices include a microphone, joystick, or game pad. Where the client device 132 comprises or is connected to an HMD, the HMD and/or sensors thereof can be input device(s) 216. These and other input devices can be connected to the processing unit(s) 202 through a user input interface 214 that is coupled to the bus 220, but may be connected by other interface and bus structures, such as a parallel port, game port or a universal serial bus (USB). It is also possible that an input device 216 includes one or more cameras and/or other capture devices that can recognize user motion and/or gestures using time-of-flight (TOF), structured light and/or other technologies. Examples of such input devices, which are commercially available, include the Kinect™ available from Microsoft Corporation (headquartered in Redmond, Wash., USA), the Play Station™ Camera available from Sony Corporation (headquartered in Tokyo, Japan) and the Senz3D™ available from Creative Technology Ltd (headquartered in Singapore). Where the client device 132 is a smartphone, a camera on the smartphone can be used to capture a user's facial expressions and facial gestures, a user's head pose, a user's head gestures (such as nodding one's head up and down, or rotating one's head left and right), and the like. In other words, a smartphone camera can be an input device 216. An input device 216 can also include one or more motion sensors, such as, but not limited to a gyroscope, an accelerometer and/or a magnetometer. An input device 216 can also include optical sensor technology. These are just a few examples of the type of input devices 216 that can be used to accept, capture or obtain inputs from users, which are not intended to be all encompassing.

A monitor or other type of display device 222 can be connected to the video codec 210 via audio/visual (A/V) ports 212 or some other video interface. Headphones, speakers or some other audio output device 224 can be connected to the audio codec 208 via the A/V ports 212 or some other audio interface. In specific embodiments, in order to enable a user to experience spatialized sound, the audio output device 224 provides for stereo sound, and more specifically, at least two-channel (e.g., left and right) audio, and potentially more than two-channel audio. Where the client device 132 comprises or is connected to an HMD, the display device 222 can be part of the HMD, as can the headphones, speakers or some other audio output device 224, as can other components shown in FIG. 2.

Figure 3:
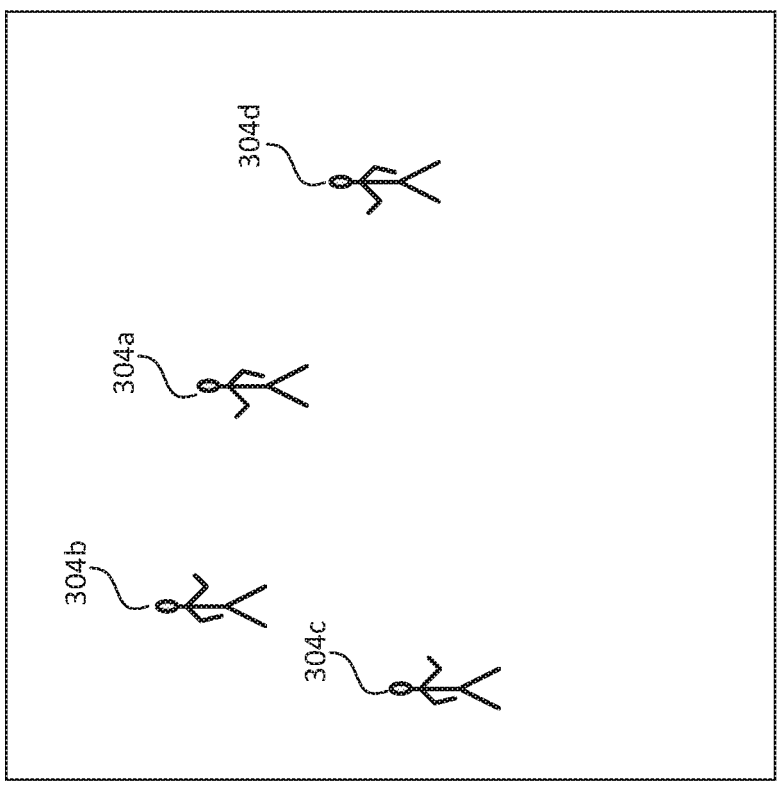
FIG. 3 shows an exemplary portion of a VR environment, which includes multiple avatars, and which is used to describe how a VR environment can be viewed from a third-person perspective.

There are various ways in which a user exploring a VR environment, using a client device 132, can view the VR environment. For example, a user may view the VR environment through the eyes of the user's avatar, i.e., from a first-person perspective, in which case the user may be able to see the body and arms of their avatar but not the head of their avatar (unless looking at a virtual mirror or at some other virtual reflection of their avatar). When in the first-person perspective, a specific user can see the avatar(s) of one or more other users' that are within the field of view (FOV) of the specific user. Alternatively, when a third-person perspective is used a specific user can see their entire avatar as well as other avatars that are located within a same scene in a VR environment, even if the other users are not necessarily within the FOV of the specific user's avatar. For example, FIG. 3 shows an exemplary portion of a VR environment that includes four avatars labeled 304a, 304b, 304c and 304d, which can be referred to collectively as the avatars 304, or individually as an avatar 304. While the avatars 304 in FIG. 3 are illustrated as stick figures for ease of illustration, the avatars 304 within a VR environment would more likely be much more elaborate, detailed and realistic in an actual implementation. Additionally, it is noted that an avatar need not resemble a human, but can essentially resemble anything that a user wants, such as an animal, robot, plant, vehicles, super hero, etc., or more generally anything that a user can imagine. For the sake of this discussion, it is assumed that FIG. 3 shows a third-person perspective for the user that is controlling the avatar 304a. The user that is controlling the avatar 304a can also be referred to as the user corresponding to the avatar 304a, or the user associated with the avatar 304a. Similarly, the avatar 304a can be referred to as the avatar of a user, or an avatar corresponding to or associated with the user.

Figure 4:
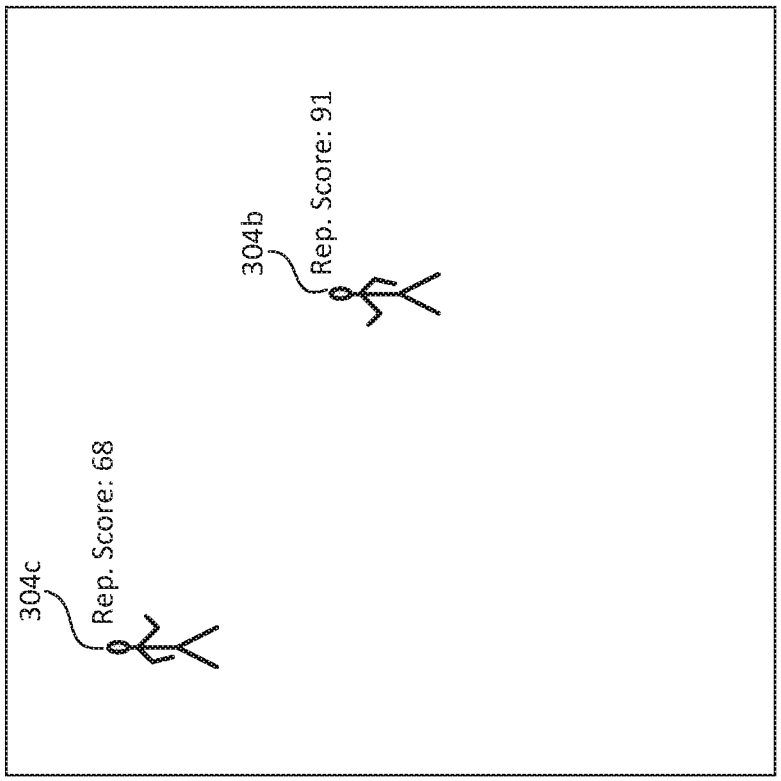
FIG. 4 shows an exemplary portion of a VR environment, which includes multiple avatars, and which is used to describe how a VR environment can be viewed from a first-person perspective.

Since FIG. 3 shows a third-person perspective for the user associated with the avatar 304a, the users associated with the avatar 304a can see the avatars 304b and 304c (which are in front of the avatar 304a and within the FOV of the avatar 304a), their own avatar 304a, as well as the avatar 304d (which is behind the avatar 304a, and thus, not actually within the FOV of the avatar 304a, unless the avatar 304a had turned its head to look behind itself). By contrast, FIG. 4 shows a first-person perspective for the user that is controlling the avatar 304a. In FIG. 4 the user of the avatar 304a can see the avatars 304b and 304c, which are in front of the avatar 304a and within the FOV of the avatar 304a. However, in FIG. 4 the user of the avatar 304a cannot see the avatar 304d, which is behind the avatar 304a, and thus, not actually within the FOV of the avatar 304a. Further, in FIG. 4 the user's own avatar 304a is not shown, although it would be possible that from the first-person perspective that user would be able to see at least a portion of their avatar 304a that is within their FOV, such as their arms and/or legs, but not limited thereto. When a user is exploring a VR environment, the user may be able to use a user interface to switch back and forth between exploring the VR environment using a third-person perspective (e.g., such as in FIG. 3) or a first-person perspective (e.g., such as in FIG. 4). It would also be possible for a user to change how the third-person perspective is shown, e.g., from a side view, or from a top view, and/or the like. In the following description, the user associated with the avatar 304a is often referred to as user A, the user associated with the avatar 304b is often referred to as user B, the user associated with the avatar 304c is often referred to as user C, and the user associated with the avatar 304d is often referred to as user D.

In accordance with certain embodiments of the present technology, users of a VR environment are able to access one or more reputation score(s) associated with another one of the users of the VR environment. For example, such embodiments enable a user (e.g., user A) of the VR environment to access, using the client computing device (e.g., 132a) they are using, one or more reputation score(s) associated with another one of the users of the VR environment. For example, in accordance with certain embodiments, whenever user A (or their avatar 304a) looks at the avatar 304b (of user B), the reputation score of the user (i.e., user B) associated with the avatar 304b can be automatically displayed to the user A. Similarly, whenever user A (or their avatar 304a) looks at the avatar 304c (of user C), the reputation score of the user (i.e., user C) associated with the avatar 304c can be automatically displayed to the user A. More generally, one or more reputation scores associate with each avatar (and more specifically, the user associated therewith) that is displayed to a user (e.g., user A) can be automatically and simultaneously displayed to the user. For example, in FIG. 4, a reputation score (Rep. Score) of 68 is shown as being displayed near the avatar 304c (for user C), and a reputation score of 91 is shown as being displayed near the avatar 304b (for user B). The reputation score(s) that is/are automatically displayed can always be displayed, or can just be displayed for a specified amount of time starting at the point at which a user (and/or their avatar) initially sees the avatar(s) of one or more other users. In certain embodiments, one or more reputation score(s) of another use can be automatically displayed to a user when the user is about to perform an interaction (e.g., entering into a financial transaction or some other agreement with the other user) for which it is likely that the user would want to know the reputation score(s) of the other user before confirming they want to proceed with performing the interaction. In certain embodiments, reputation score(s) can be displayed to a user in response to a specified user input (via a user interface of the client computing device being used by user). Such a user input can be a certain button or combination of buttons being pressed, or a specific gesture being made, or a specific selection from a pulldown menu, just to name a few. Where reputations score(s) is/are automatically displayed to a user for only a brief period of time, the user can thereafter cause the reputation score(s) to be redisplayed by selecting a specified user input.

Reputations scores can be numeric value within some specified range. For example, the range of numeric value reputation scores can be from 0 to 1, from 0 to 4, from 1 to 4, from 0 to 10, from 1 to 10, from 0 to 100, or from 1 to 100, but are not limited thereto. Reputation scores need not be numeric values, but can instead be indicated by a quantity of symbols, such as stars, smiley faces, or the like. For example, a reputation score can be within the range of zero to four stars. Reputation scores can alternatively be color based, e.g., with green representing a high or good reputation, yellow representing a medium reputation, and red representing a low or bad reputation. Other variations, some of which are described below, are also possible and within the scope of the embodiments described herein.

As noted above, a second user will typically appreciate if a first user provides them with a positive rating, which may be used to increase the reputation score for the second user, which can also be referred to as the rating for the second user. Conversely, a second user will typically not appreciate if a first user provides them with a negative rating, which may be used to decrease the reputation score for the second user. Indeed, some users may want to retaliate against other users that provide them with negative ratings. For example, if a second user knows that a first user gave them a negative rating (even though justified), the second user may in-turn give the first user a negative rating and/or have numerous friends give the first user a negative rating (event though not justified). For a more specific example, the second user may give the first user a negative rating because the first user did not perform a job they were paid to perform, or because the first user did a poor job. The second user, if sophisticated, can learn (e.g., by observing a public database where reputation scores and transactions are stored) that the first user gave them the negative rating and may retaliate against the first user for no other reason than the first user having given them a justified negative rating. This can have the chilling effect of causing users of a VR environment to not give other users justified negative ratings because they are afraid of being retaliated against. This will have the adverse effect of making reputation scores for users of the VR environment less informative and reliable, and thus, not as trustworthy. Certain embodiments of the present technology, which are now described below, can be used to reduce a probability that a second user will retaliate against a first user, thereby reducing the above described potential chilling effect.

Server Submits Negative Reports on Behalf of Users

In accordance with certain embodiments of the present technology, a server that supports a portion of a computer implemented VR environment submits negative reports on behalf of users in order to reduce the probability of users retaliating against one another in response to receiving negative ratings. Such embodiments will initially be described with reference to FIG. 5, which is a high level flow diagram that is used to describe a method that can be used to enable a first user to negatively rate a second user in a VR environment in a manner that reduces a probability that the second user will retaliate against the first user. Referring back to FIG. 1, the server 102 shown thein is an example of a server that can support a portion of a VR environment, and the client computing devices 132a and 132b are examples of computing devices that first and second users, respectively, can use to explore the VR environment. Accordingly, the server 102 is an example of a server that can be used to perform the method described with reference to FIG. 5. Still referring back to FIG. 1, a first user (e.g., user A) may use the client computing device 132a to control a first avatar within the portion of the VR environment supported by the server 102, and a second user (e.g., user B) may use the client computing device 132b to control a second avatar within the portion of the VR environment supported by the server 102.

Figure 5:
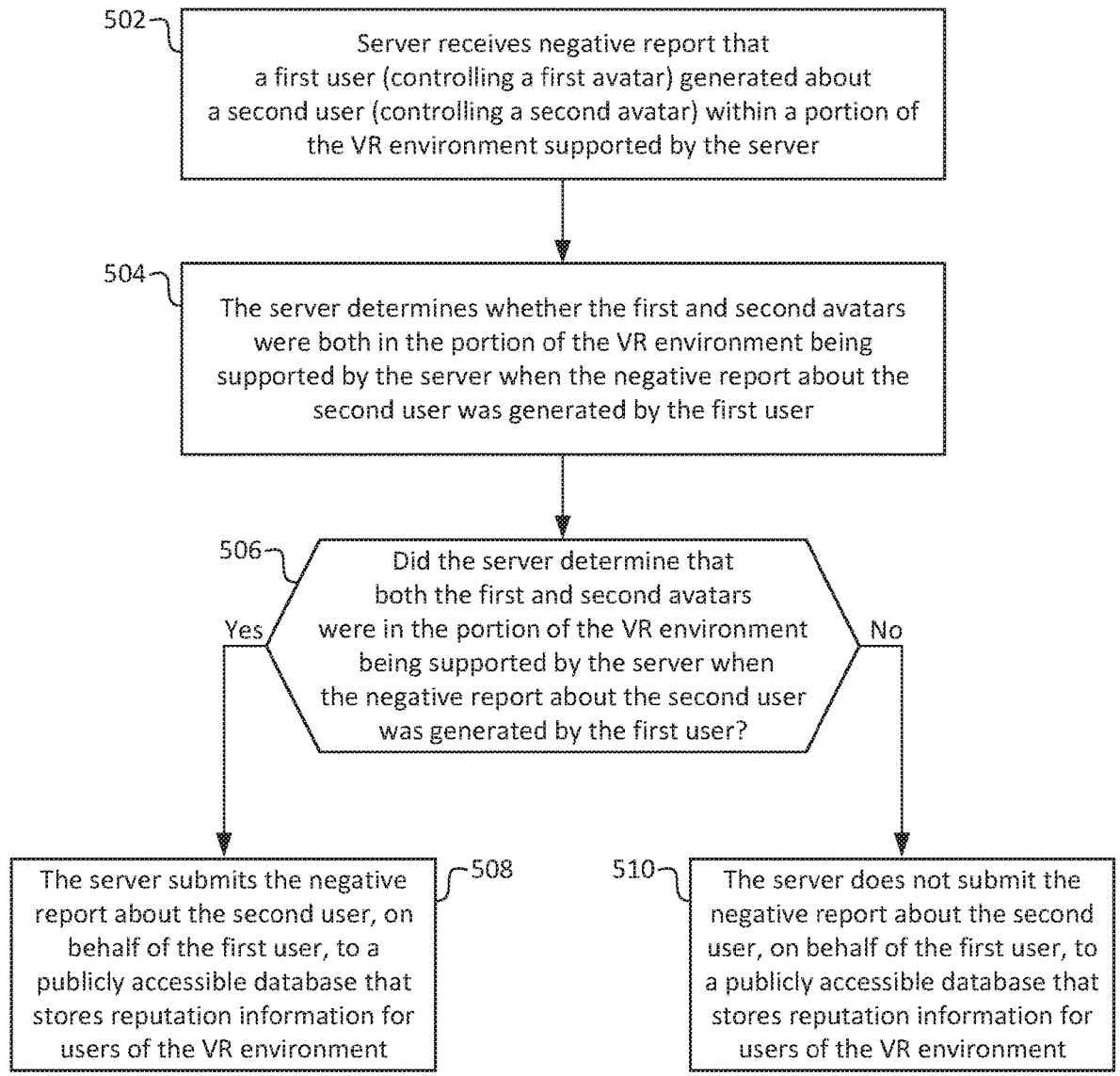
FIGS. 5 and 6 are high level flow diagrams that are used to describe various methods that can be used to enable a first user to negatively rate a second user in a VR environment in a manner that reduces a probability that the second user will retaliate against the first user.

Referring now to FIG. 5, step 502 involves the server receiving a negative report that a first user controlling a first avatar within the portion of the VR environment generated about a second user controlling a second avatar within the portion of the VR environment. A negative report, as the term is used herein, refers to a message, signal, or other indicator that a first user submits or otherwise produces about a second user, indicating that the first user has a negative impression of the second user. Referring briefly back to FIG. 1, the server 102 may receive such a negative report from user A of the client computing device 132a via one or more networks 122, which may include the Internet. The negative report can, e.g., be about user B of the client computing device 132b. User A may have given user B a negative rating because the first user did not perform a job they were paid to perform. For another example, user A may having given the user B a negative rating because user A paid user B to perform a job that was performed poorly. In another example, user A may have given user B a negative rating because user A granted user B access to a virtual event that user A was having, and user B nefariously utilized a virus or an overtly complex to render virtual element in order to cause software applications to crash or slow to a crawl. These are just a few examples of why user A may have justly given user B a negative rating, which examples are not intended to be all encompassing. The message that user A sends to the server (e.g., 102 in FIG. 1) about user B, which message includes a negative rating, is referred to herein as a negative report. Such a report can include a unique identifier for user A, a unique identifier for user B, and some indication that user A has a negative impression of user B. Exemplary negative ratings were discussed above, and thus, need not be repeated again. At step 502, the server may receive the negative report (that the first user generated about the second user) in response to the first user sending the negative report to the server. Alternatively, after the first users generates the negative report about the second user, the negative report can be stored in a data store (e.g., database) from which the server fetches the negative report. In other words, negative reports can be pushed to the server, or pulled by the server. Either way, the server will receive the negative report that the first user generated about the second user. Other ways in which the server can receive negative reports may also be possible, and are within the scope of the embodiments described herein.

Referring again to FIG. 5, step 504 involves the server determining whether the first and second avatars, controlled respectively by the first and second users, were both in the portion of the VR environment being supported by the server when the negative report about the second user was generated by the first user, and step 506 is a decision block that is based on the results of step 504. If the answer to the decision at step 506 is Yes, the flow goes to step 508. If the answer to the decision at step 506 is No, then flow goes to step 510.

If flow goes to step 508, then the server submits the negative report about the second user, on behalf of the first user, to a publicly accessible database that stores reputation information for users of the VR environment. If the flow instead goes to step 510, then the server does not submit the negative report about the second user, on behalf of the first user.

The reason that the server only submits the negative report (about the second user, on behalf of the first user) if the first and second avatars (controlled respectively by the first and second users) were both in the portion of the VR environment being supported by the server when the negative report about the second user was generated by the first user, is that it reduces the chance of (and preferably prevents) a user purposely reducing the reputation score of another user that the user didn't interact with (or at least recently interact with). This also reduces the probability that a user can generate a nefarious script that automatically negatively rates numerous other users of the VR environment in an attempt to adversely affect the VR environment and the users thereof.

In the method summarized with reference to FIG. 5, because the server submits the negative report about the second user to the publicly accessible database, on behalf of the first user, the second user cannot determine from the publicly accessible database that the first user generated the negative report about the second user. This reduces a probability that the second user will retaliate against the first user, compared to if the second user were able to determine from the publicly accessible database that the first user generated the negative report about the second user.

There are various ways in which the server can perform instances of step 504. In accordance with an embodiment, encryption keys are used to perform step 504. More specifically, each of the users of the VR environment is associated with a respective public key and a respective private key. The server (e.g., 102 in FIG. 1) receives the public key of each of the users whose avatar is within the portion of the VR environment being supported by the server. For example, a user may need to provide their public key to the server to enter the portion of the VR environment supported by the server, otherwise the server will not allow the user's avatar to enter the portion of the VR environment. In such an embodiment, if both the first and second avatars (controlled respectively by the first and second users) were both in the portion of the VR environment (being supported by the server) when the negative report about the second user was generated by the first user, then the server would have had the public keys of the first and second users. In other words, the server can use the public keys of the first and second users to confirm that the first and second avatars, controlled respectively by the first and second users, were both in the portion of the VR environment being supported by the server when the negative report about the second user was generated by the first user. Such public and private keys can be associated with Secure Sockets Layer (SSL) certificates, and more generally, an SSL protocol that is used to establish secure connections between entities, such as a client device and a server. The server may alternatively receive a public key be fetching the public key. In other words, public keys can be pushed to the server, or pulled by the server. Either way, the server will receive the public keys of users. Other ways in which the server can receive public keys may also be possible, and are within the scope of the embodiments described herein.

A public key is an example of a unique identifier associate with a user. However, it would also be possible for individual users to each be associated with one or more alternative and/or additional unique identifier(s), and that one or more alternative and/or additional unique identifier(s) be used by the server to confirm that avatars controlled by users were in the portion of the VR environment being supported by the server when the negative report was generated by one of the users about another one of the users. For example, a unique identifier can be an alphanumeric password generated by a user alone or in combination with an alphanumeric identifier autonomously generated by a server, or the like. More generally, each of the users of the VR environment can be associated with a respective unique identifier, and a server can be provided with the unique identifier of each of the users whose avatar is within the portion of the VR environment being supported by the server. The server can then use the unique identifiers, e.g., of first and second users, to confirm that first and second avatars, controlled respectively by the first and second users, were both in the portion of the VR environment being supported by the server when the negative report about the second user was generated by the first user.

In accordance with certain embodiments, the negative report about the second user that is generated by the first user (and submitted by the server on behalf of the first user) is used to adjust a reputation score of the second user that is made available to other users. More specifically, a negative report about a user can be used to reduce the reputation score of the user. Conversely, a positive report about a user can be used to increase the reputation score of the user. Depending upon implementation, the server may, or may not, submit positive reports on behalf of users. The amount by which a user's reputation score is reduced (or increased) can depend on various factors, such as, but not limited to, the reputation score of the user that originally generated the negative (or positive) report. For example, if a user with a very high reputation score submits a negative report about another user, that negative report can be used to reduce the other user's reputation by more than would occur if the user that submitted the negative report had a low reputation score. For another example, the amount by which a user's reputation score is reduced (or increased) can depend on the extent to which they were rated negatively (or positively). Other variations are also possible and within the scope of the embodiments described herein. Exemplary manners in which reputations scores can be made available to users were described above with reference to FIG. 4.

The first user (e.g., user A) can submit the negative report about the second user (e.g., user B) to the server (e.g., 102 in FIG. 1) while avatars of the first and second users are still both in the portion of the VR environment being supported by the server. Alternatively the first users can submit that negative report about the second user at a later time, i.e., when avatars of the first and second users are no longer both in the portion of the VR environment being supported by the server, so long as the negative report was generated while avatars of the first and second users were both in the portion of the VR environment being supported by the server. For the latter embodiment to work, the generating of a negative report and the submitting of the negative report would be different actions. For the former embodiment to work, a negative report can automatically be submitted as soon as it is generated, and thus, the generation and submission of a negative report can be considered the same action.

In accordance with certain embodiments, the server (e.g., 102 in FIG. 1) signs and submits negative reports to a public database. Accordingly, if people (e.g., users) were to observe the public database that stores information about submitted rating or reputation reports, people would see that it was the server that signed the negative report, and thus, people would not be able to determine from the public database which user actually generated the negative report in the first place. For this approach to be effective, people would need to trust the server to attest to a negative reputation claim. However, people could choose whether or not to trust the server as an authoritative source of information regarding user reputations. Various different types of publicly accessible databases can be used to store reputation information for users of the VR environment, and embodiments of the present technology, unless stated otherwise, are not intended to be limited to implementation with any specific types of databases. For example, a publicly accessible database can be a hierarchical database, a network database, a relational database, or an object-oriented database, just to name a few. For a more specific example, a publicly accessible database can be a relational database management system (RDMBS) with a publicly facing application program interface (API). The publicly accessible database can be, e.g., an event store, a document store, and/or a record store type database. The publicly accessible database can be a structured query language (SQL) database, or a non-SQL database. In accordance with certain embodiments, the publicly accessible database, which stores reputation information for users of the VR environment, is a distributed database, such as, but not limited to, an InterPlanetary File System (IPFS) or a Domain Name System (DNS) type datastore. Other variations are also possible and within the scope of the embodiments described herein. A publicly accessible database is sometimes referred to more succinctly herein as a public database. A database is considered to be publicly accessible (or more succinctly, a public database) if its contents (e.g., reputation information) can be observed or otherwise accessed by users of the VR environment, as opposed to just be administrators of the VR environment.

In accordance with certain embodiments, the public database, which stores reputation information for users of the VR environment, is stored in a blockchain. A blockchain is a continuously growing list of records, called blocks, which are linked and secured using cryptography. Each block typically contains a cryptographic hash of the previous block, a timestamp and transaction data. By design, a blockchain is inherently resistant to modification of the data. It is "an open, distributed ledger that can record transactions between two parties efficiently and in a verifiable and permanent way." For use as a distributed ledger, a blockchain is typically managed by a peer-to-peer network collectively adhering to a protocol for validating new blocks. Once recorded, the data in any given block cannot be altered retroactively without the alteration of all subsequent blocks, which requires collusion of the network majority. Blockchains are secure by design and are an example of a distributed computing system with high *Byzantine* fault tolerance. Decentralized consensus has therefore been achieved with a blockchain. By publishing or storing reputation scores and other types of information described herein in a blockchain, users and/or hackers can be prevented from hacking into a system in order to try to nefariously alter such information for their benefit and/or the detriment of others.

In the above described embodiments, a server signs and submits negative reports about users (e.g., to a publicly accessible database) on behalf of other users. Since it is the server that is responsible for submitting the negative reports, the server or the server's administrator can act as a discriminator or gatekeeper for such negative reports. For example, if the server or the server's administrator recognizes that a specific user keeps filing negative reports about one or more other users, without contributing anything positive to the VR environment, the server may under specified circumstances chose not to submit the negative reports on behalf of that user. Additionally, or alternatively, the server or the server's administrator may ban that user from the VR environment, or at least limit the user's interaction with the VR environment. More generally, if the server or the server's administrator recognizes that a specific user is primary attempting to negatively affect the VR environment and/or other users of the VR environment, the server or the server's administrator can do what they deem appropriate to maintain the health of the VR environment and its users.

Ring Signatures Used to Submit Negative Reports on Behalf of Users

In accordance with certain embodiments of the present technology, rather than (or in addition to) having an individual user (or a server) sign and submit a negative report about another user to a public database, a ring signature is used to sign the negative report before it is submitted to the public database. A ring signature is a type of digital signature that can be used by any member of a group of entities (e.g., users) that each have a respective key. A message signed with a ring signature is endorsed by someone in a particular group, but one of the security properties of a ring signature is that it is computationally infeasible to determine which member of the group generated and signed the message with the ring signature. Further, with a ring signature, while the validity of the signature can be checked and verified, the specific entity within the group that produced the message and caused it to be signed with the ring signature could not be deduced.

In a ring signature, each entity within a group of entities have their own public/private key pairs. For example, for a first entity, a second entity, . . . nth entity, the public/private key pairs can be expressed as (P1, S1), (P2, S2), . . . , (Pn, Sn), where the "P" refers to the public key of the pair, and the "S" refers to the private key (also known as a "secret key") of the pair. In accordance with certain embodiments, if an entity i wants to sign a message, the secret key (Si) of the entity i and the public keys of the other entities in the group are used to produce a ring signature that is used to sign the message. It is then be possible to check the validity of the message based on the public keys of the group, but without being able to determine which entity of the group generated the message.

In accordance with certain embodiments, in a ring signature scheme there are no prearranged groups of users, there are no procedures for setting, changing, or deleting groups, there is no way to distribute specialized keys, and there is no way to revoke the anonymity of the actual signer (unless the signer decides to expose themselves). It is assumed that each member of the group is already associated with the public key of some standard signature scheme such as RSA (Rivest-Shamir-Adleman). In accordance with certain embodiments, to produce a ring signature, the actual signer declares an arbitrary set of possible signers that includes himself, and computes the signature entirely by himself using only his secret key and the others' public keys.

So let's say that users A, B, C and D of a VR environment each have their own respective public key and secret key. Assume that user A wants to submit a negative report about user B, but doesn't want user B to know that it was user A that submitted the negative report. Rather than user A signing the negative report with user A's public key, user A can sign the message from the group that includes users A, B, C and D. In other words user A can generate and submit a negative report that is signed by the group, such that the signature is capable of being validated, but the identify of user that generated and submitted the negative report (and caused the negative report to be signed using the ring signature) is hidden.

In accordance with an embodiment, it would be the client device (e.g., 132a) of the user A that generates the ring signature. In another embodiment, a server can act as an agent for the client and generate the ring signature. The server that generates the ring signature can be the server that is supporting a portion of the VR environment. Alternatively, some other server can act as an agent for the client and generate the ring signature. Where it is the client device, e.g., 132a, of the user A that generates the ring signature, then the negative report about user B can be submitted to a public database (that stores reputation information) by the client device 132a. Alternatively, the client device 132a can generate the ring signature, and then a server can submit the negative report signed using the ring signature on behalf of the client device 132a, or more generally, on behalf of the user A. Where it is a server e.g., 102, that generates the ring signature, then the negative report about user B can be submitted to a public database (that stores reputation information) by the server that generates or the ring signature, or potentially, but another server. Other variations are also possible. Irrespective of the specific implementation, because the negative report is signed using a ring signature, if people (e.g., users) were to observe the public database that stores information about submitted rating or reputation reports, people would not be able to determine from the public database which user actually generated the negative report in the first place.

A ring signature for a group of users (that are navigating their avatars through a same portion of a VR environment) can be generated periodically, or more generally from time-to-time. Where a ring signature for a group of users is generated from time-to-time (e.g., every few seconds, or every minute, but not limited thereto), then the ring signature will be available for use whenever a user wants to submit a negative report about another user. Alternatively, a ring signature may only be generated in response to some triggering event, such as an indication that a first user has or wants to submit a negative report about a second user. In other words, a ring signature may be generated on-demand, when there is the need for the use of the ring signature. Other variations are also possible and within the scope of the embodiments described herein.

Figure 6:
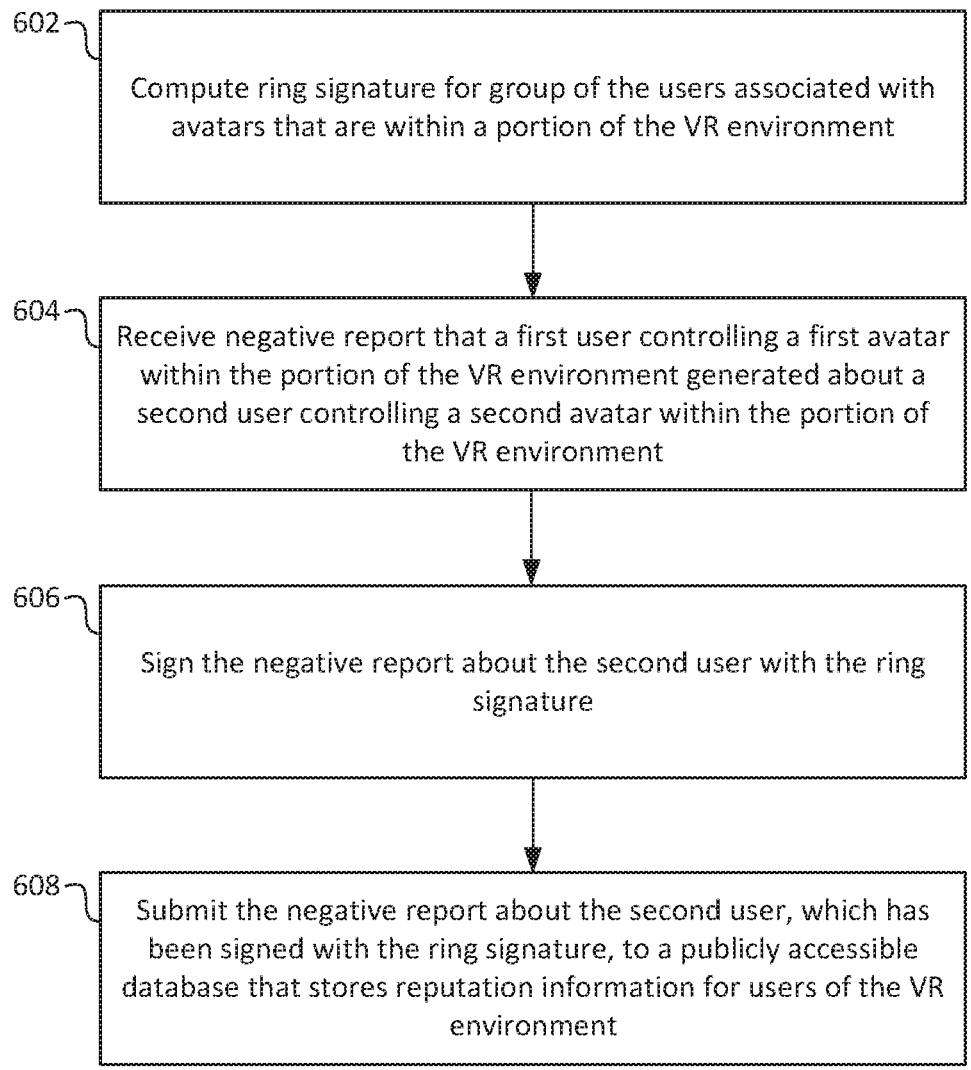

The high level flow diagram of FIG. 6 will now be used to summarize embodiments of the present technology involving using a ring signature to sign a negative report before it is submitted to a public database. Referring to FIG. 6, step 602 involves computing a ring signature for a group of the users associated with avatars that are within a portion of the VR environment. Step 604 involves receiving a negative report that a first user controlling a first avatar within the portion of the VR environment generated about a second user controlling a second avatar within the portion of the VR environment. Step 606 involves signing the negative report about the second user with the ring signature. Step 608 involves submitting the negative report about the second user, which has been signed with the ring signature, to a publicly accessible database that stores reputation information for users of the VR environment. In the embodiments summarized with reference to FIG. 6, because the negative report about the second user, as submitted to the publicly accessible database is signed with the ring signature, the second user cannot determine from the publicly accessible database that the first user generated the negative report, and thus, a probability that the second user will retaliate against the first user is reduced compared to if the second user were able to determine from the publicly accessible database that the first user generated and/or signed the negative report.

In FIG. 6, step 602 is shown as occurring prior to step 604. Where that is the case, at step 606, the ring signature that is used to sign the negative report produced at step 606 has already been produced prior to the negative report being produced. Alternatively, the order of steps 602 and 604 can be reversed, such that the ring signature is produced in response to the first user generating the negative report about the second user, or in response to such a report being received by a server, depending upon implementation, such as depending upon what entity generates the ring signature. The ring signature (which is generated at step 602 and used to sign the negative report at step 606) can be generated by a client device (e.g., the client device 132a of the user A), by a server that acts as an agent for the client, or by a server (e.g., 102 in FIG. 1) that is supporting a portion of the VR environment (being navigated by the user that generates the negative report and the user for which the negative report is about), as noted above, but is not limited thereto, as other variations are also possible. The ring signature can be used to validate the negative report, such that if people trust the people who were members of the ring signature, they can also trust the negative report, without needing to know which of the people generated the negative report.

There may be certain benefits to step 602 occurring prior to step 604, i.e., benefits to a ring signature for a group of users being created before a negative report is generated by one of the users. Such benefits could include preventing other users from inferring who submitted a negative report based on, e.g., who requested or caused the ring signature to be generated within a close temporal proximity of the negative report being submitted or received. Nevertheless, certain embodiments described herein involve step 604 occurring prior to step 602. In other words, the ring signature could be generated could be produced after a negative report is generated or received, in which case the order of steps 602 and 604 can be reversed.

As noted above, each of the users is associated with a respective public key and a respective private key. In accordance with certain embodiments, the ring signature is computed using the public keys of the group of the users associated with avatars that are within a specific portion of the VR environment. In alternative embodiments, it would also be possible to define or select the group of users (whose public keys are used to generate the ring signature) in some other manner.

As was discussed above with reference to the embodiments of FIG. 5, there are certain benefits to only allowing a first user to submit a negative report about a second user, if the first and second avatars (controlled respectively by the first and second users) were both in a same portion of the VR environment (being supported by a same server) when the negative report about the second user was generated by the first user. For example, this reduces the chance that (and preferably prevents) a user purposely reduces the reputation score of another user that the user didn't actually interact with (or at least recently interact with). This also reduces the probability that a user can generate a nefarious script that automatically negatively rates numerous other users of the VR environment in an attempt to adversely affect the VR environment and the users thereof. Such features can also be applied to the embodiments summarized with reference to FIG. 6. More specifically, in a similar manner as was discussed above for steps 504 and 506 in FIG. 5, a server, which supports the portion of the VR environment, can determine whether the first and second avatars, controlled respectively by the first and second users, were both in the portion of the VR environment being supported by the server when the negative report about the second user was generated by the first user. The server can then allow the negative report about the second user (generated by the first user) to be signed with the ring signature and submitted to the publicly accessible database, in response to the server determining that the first and second avatars, controlled respectively by the first and second users, were both in the portion of the VR environment being supported by the server when the negative report about the second user was generated by the first user. Conversely, the server can prevent the negative report about the second user (generated by the first user) from being signed with the ring signature and submitted to the publicly accessible database, in response to the server determining that the first and second avatars, controlled respectively by the first and second users, were not both in the portion of the VR environment being supported by the server when the negative report about the second user was generated by the first user.

Assuming the negative report generated by the first user, about the second user, is submitted to a publicly accessible database (e.g., stored in a blockchain), the negative report about the second user (that is generated by the first user) can be used to adjust a reputation score of the second user, which such reputation score is made available to other users.

The negative report about the second user that is generated by the first user (and submitted by the server on behalf of the first user) can be used to adjust a reputation score of the second user that is made available to other users. More specifically, a negative report about a user can be used to reduce the reputation score of the user. Conversely, a positive report about a user can be used to increase the reputation score of the user. Depending upon implementation, a server or a client device may submit positive reports on behalf of users. The amount by which a user's reputation score is reduced (or increased) can depend on various factors, such as, but not limited to, the reputation score of the user that originally generated the negative (or positive) report. For example, if a user with a very high reputation score submits a negative report about another user, that negative report can be used to reduce the other user's reputation by more than would occur if the user that submitted the negative report had a low reputation score. For another example, the amount by which a user's reputation score is reduced (or increased) can depend on the extent to which they were rated negatively (or positively). Other variations are also possible and within the scope of the embodiments described herein. Exemplary manners in which reputations scores can be made available to users were described above with reference to FIG. 4.

The first user (e.g., user A) can submit the negative report about the second user (e.g., user B) to the server (e.g., 102 in FIG. 1) while avatars of the first and second users are still both in the portion of the VR environment being supported by the server. Alternatively the first users can submit that negative report about the second user at a later time, i.e., when avatars of the first and second users are no longer both in the portion of the VR environment being supported by the server, so long as the negative report was generated while avatars of the first and second users were both in the portion of the VR environment being supported by the server. For the latter embodiment to work, the generating of a negative report and the submitting of the negative report would be different actions. For the former embodiment to work, a negative report can automatically be submitted as soon as it is generated, and thus, the generation and submission of a negative report can be considered the same action.

In accordance with certain embodiments, if people (e.g., users) were to observe the public database that stores information about submitted rating or reputation reports, people would see that a ring signature was used to sign the negative report, and thus, people would not be able to determine from the public database which user actually generated the negative report in the first place.

In accordance with certain embodiments, the public database, which stores reputation information for users of the VR environment, is stored in a blockchain. Exemplary details of how this can be accomplished were discussed above with reference to FIG. 5, and thus need not be repeated.

The term VR environment refers to a computer-generated environment that generally (but in some cases may not) behave in ways that follow a user's expectations for a real-world environment. One or more computing devices that are used to produce the VR environment can be termed a VR system, and the creation of the VR environment by the VR system can be termed rendering the VR environment. As explained above, a VR environment may include an avatar, which is in this context is an entity belonging to the VR environment that has a point of perception in the VR environment. The VR system may render the virtual environment for the avatar as perceived from the avatar's point of perception. As was described above, a user of a VR environment may be associated with a particular avatar in the VR environment.

The disclosure has been described in conjunction with various embodiments. However, other variations and modifications to the disclosed embodiments can be understood and effected from a study of the drawings, the disclosure, and the appended claims, and such variations and modifications are to be interpreted as being encompassed by the appended claims.

In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate, preclude or suggest that a combination of these measures cannot be used to advantage.

A computer program may be stored or distributed on a suitable medium, such as an optical storage medium or a solid-state medium supplied together with, or as part of, other hardware, but may also be distributed in other forms, such as via the Internet or other wired or wireless telecommunication systems.

It is understood that the present subject matter may be embodied in many different forms and should not be construed as being limited to the embodiments set forth herein. Rather, these embodiments are provided so that this subject matter will be thorough and complete and will fully convey the disclosure to those skilled in the art. Indeed, the subject matter is intended to cover alternatives, modifications and equivalents of these embodiments, which are included within the scope and spirit of the subject matter as defined by the appended claims. Furthermore, in the above detailed description of the present subject matter, numerous specific details are set forth in order to provide a thorough understanding of the present subject matter. However, it will be clear to those of ordinary skill in the art that the present subject matter may be practiced without such specific details.

Aspects of the present disclosure are described herein with reference to flow diagrams and/or block diagrams of methods, apparatuses (systems) and computer program products according to embodiments of the disclosure. It will be understood that each block of the flow diagrams in (e.g., in FIGS. 5 and 6) and/or block diagrams (e.g., in FIGS. 1 and 2), and combinations of blocks in the flow diagrams and/or block diagrams, can be implemented by computer program instructions. These computer program instructions may be provided to one or more processors of a general purpose computer, special purpose computer, or other programmable data processing apparatus to produce a machine, such that the instructions, which execute via the processor(s) of the computer or other programmable instruction execution apparatus, create a mechanism for implementing the functions/acts specified in the flow diagram and/or block diagram block or blocks.

The computer-readable non-transitory media includes all types of computer readable media, including magnetic storage media, optical storage media, and solid state storage media and specifically excludes signals. It should be understood that the software can be installed in and sold with the device. Alternatively the software can be obtained and loaded into the device, including obtaining the software via a disc medium or from any manner of network or distribution system, including, for example, from a server owned by the software creator or from a server not owned but used by the software creator. The software can be stored on a server for distribution over the Internet, for example.

Computer-readable storage media (medium) exclude (excludes) propagated signals per se, can be accessed by a computer and/or processor(s), and include volatile and non-volatile internal and/or external media that is removable and/or non-removable. For the computer, the various types of storage media accommodate the storage of data in any suitable digital format. It should be appreciated by those skilled in the art that other types of computer readable medium can be employed such as zip drives, solid state drives, magnetic tape, flash memory cards, flash drives, cartridges, and the like, for storing computer executable instructions for performing the novel methods (acts) of the disclosed architecture.

For purposes of this document, it should be noted that the dimensions of the various features depicted in the figures may not necessarily be drawn to scale.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more other parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects. Similarly, a "first" user, a "second" user, and a "third" user may not imply an ordering of users, but may instead be used for identification purposes to identify different users.

For purposes of this document, the term "set" of objects may refer to a "set" of one or more of the objects.

The foregoing detailed description has been presented for purposes of illustration and description. It is not intended to be exhaustive or to limit the subject matter claimed herein to the precise form(s) disclosed. Many modifications and variations are possible in light of the above teachings. The described embodiments were chosen in order to best explain the principles of the disclosed technology and its practical application to thereby enable others skilled in the art to best utilize the technology in various embodiments and with various modifications as are suited to the particular use contemplated. It is intended that the scope be defined by the claims appended hereto.

The previous description of the preferred embodiments is provided to enable any person skilled in the art to make or use the embodiments of the present invention. While the invention has been particularly shown and described with reference to preferred embodiments thereof, it will be understood by those skilled in the art that various changes in form and details may be made therein without departing from the spirit and scope of the invention.

What is claimed is:

1. A method for use by a server that supports a portion of a computer implemented virtual reality (VR) environment in which a plurality of users can interact with one another using respective avatars controlled by the users using respective computing devices, the method comprising:
   (a) the server receiving a negative report that a first user controlling a first avatar within a portion of the VR environment generated about a second user controlling a second avatar within the portion of the VR environment;
   (b) the server confirming that the first and second avatars were both in the portion of the VR environment being supported by the server when the negative report about the second user was generated by the first user; and
   (c) the server submitting the negative report about the second user, on behalf of the first user, to a publicly accessible database that stores reputation information for users of the VR environment, in response to the server confirming that the first and second avatars were both in the portion of the VR environment being supported by the server when the negative report about the second user was generated by the first user;
   wherein because the server submits the negative report about the second user to the publicly accessible database, on behalf of the first user, the second user cannot determine from the publicly accessible database that the first user generated the negative report about the second user.

2. The method of claim 1, wherein:
   each of the users is associated with a respective public key and a respective private key;
   the server receives the public key of each of the users whose avatar is within the portion of the VR environment being supported by the server; and
   the server uses the public keys of the first and second users to confirm that the first and second avatars were both in the portion of the VR environment being supported by the server when the negative report about the second user was generated by the first user.

3. The method of claim 1, wherein:
each of the users is associated with respective a unique identifier;
the server receives the unique identifier of each of the users whose avatar is within the portion of the VR environment being supported by the server; and
the server uses the unique identifiers of the first and second users to confirm that the first and second avatars were both in the portion of the VR environment being supported by the server when the negative report about the second user was generated by the first user.

4. The method of claim 1, wherein the negative report about the second user that is generated by the first user is used to adjust a reputation score of the second user that is made available to other users.

5. The method of claim 1, wherein the public database, which stores reputation information for users of the VR environment, is stored in a blockchain.

6. One or more processor readable storage devices having instructions encoded thereon which when executed cause one or more processors of a server to perform a method, wherein the server supports a portion of a computer implemented virtual reality (VR) environment in which a plurality of users can interact with one another using respective avatars controlled by the users using respective computing devices, the method comprising:
(a) the server receiving a negative report that a first user controlling a first avatar within a portion of the VR environment generated about a second user controlling a second avatar within the portion of the VR environment;
(b) the server confirming that the first and second avatars were both in the portion of the VR environment being supported by the server when the negative report about the second user was generated by the first user; and
(c) the server submitting the negative report about the second user, on behalf of the first user, to a publicly accessible database that stores reputation information for users of the VR environment, in response to the server confirming that the first and second avatars were both in the portion of the VR environment being supported by the server when the negative report about the second user was generated by the first user;
wherein because the server submits the negative report about the second user to the publicly accessible database, on behalf of the first user, the second user cannot determine from the publicly accessible database that the first user generated the negative report about the second user.

7. The one or more processor readable storage devices of claim 6, wherein:
each of the users is associated with a respective public key and a respective private key;
the server receives with the public key of each of the users whose avatar is within the portion of the VR environment being supported by the server; and
the server uses the public keys of the first and second users to confirm that the first and second avatars were both in the portion of the VR environment being supported by the server when the negative report about the second user was generated by the first user.

8. The one or more processor readable storage devices of claim 6, wherein:

each of the users is associated with respective a unique identifier;
the server receives the unique identifier of each of the users whose avatar is within the portion of the VR environment being supported by the server; and
the server uses the unique identifiers of the first and second users to confirm that the first and second avatars were both in the portion of the VR environment being supported by the server when the negative report about the second user was generated by the first user.

9. A server for supporting a computer implemented virtual reality (VR) environment in which users of the VR environment can explore the VR environment and interact with one another within the VR environment using client computing devices that are being used by the users, the server comprising:
a network interface of the server configured to receive a negative report that a first user controlling a first avatar within a portion of the VR environment generated about a second user controlling a second avatar within the portion of the VR environment;
one or more processors of the server configured to confirm that the first and second avatars were both in the portion of the VR environment being supported by the server when the negative report about the second user was generated by the first user; and
the one or more processors of the server also configured to submit the negative report about the second user, on behalf of the first user, to a publicly accessible database that stores reputation information for users of the VR environment, in response to the one or more processors of the server confirming that the first and second avatars were both in the portion of the VR environment being supported by the server when the negative report about the second user was generated by the first user;
wherein because the server submits the negative report about the second user to the publicly accessible database, on behalf of the first user, the second user cannot determine from the publicly accessible database that the first user generated the negative report about the second user.

10. The server of claim 9, wherein:
each of the users is associated with respective a unique identifier;
the server receives the unique identifier of each of the users whose avatar is within the portion of the VR environment being supported by the server; and
the server uses the unique identifiers of the first and second users to confirm that the first and second avatars were both in the portion of the VR environment being supported by the server when the negative report about the second user was generated by the first user;
the unique identifiers associated with the users can be respective public keys associate with the users.

11. A method for use with a computer implemented virtual reality (VR) environment in which users can interact with one another using respective avatars controlled by the users using respective computing devices, the method comprising:
(a) computing a ring signature for a group of the users associated with avatars that are within a portion of the VR environment;
(b) receiving a negative report that a first user controlling a first avatar within the portion of the VR environment generated about a second user controlling a second avatar within the portion of the VR environment;
(c) signing the negative report about the second user with the ring signature; and (d) submitting the negative report about the second user, which has been signed with the ring signature, to a publicly accessible database that stores reputation information for users of the VR environment;

wherein because the negative report about the second user, as submitted to the publicly accessible database is signed with the ring signature, the second user cannot determine from the publicly accessible database that the first user generated the negative report.

12. The method of claim 11, wherein:

each of the users is associated with a respective public key and a respective private key; and the ring signature is computed using the private key of the first user and the public keys of other members of the group of the users associated with avatars that are within the portion of the VR environment.

13. The method of claim 11, further comprising:

a server, which supports the portion of the VR environment, determining whether the first and second avatars were both in the portion of the VR environment being supported by the server when the negative report about the second user was generated by the first user;

the server allowing the negative report about the second user to be signed with the ring signature and submitted to the publicly accessible database, in response to the server determining that the first and second avatars were both in the portion of the VR environment being supported by the server when the negative report about the second user was generated by the first user; and the server preventing the negative report about the second user from being signed with the ring signature and submitted to the publicly accessible database, in response to the server determining that the first and second avatars, controlled respectively by the first and second users, were not both in the portion of the VR environment being supported by the server when the negative report about the second user was generated by the first user.

14. The method of claim 11, wherein the negative report about the second user that is generated by the first user is used to adjust a reputation score of the second user that is made available to other users.

15. The method of claim 11, wherein the public database, which stores reputation information for users of the VR environment, is stored in a blockchain.

16. One or more processor readable storage devices having instructions encoded thereon which when executed cause one or more processors to perform a method for use with a virtual reality (VR) environment in which users can explore the VR environment and interact with one another within the VR environment using client computing devices that are being used by the users, the method comprising:

(a) computing a ring signature for a group of the users associated with avatars that are within a portion of the VR environment;

(b) receiving a negative report that a first user controlling a first avatar within the portion of the VR environment generated about a second user controlling a second avatar within the portion of the VR environment;

(c) signing the negative report about the second user with the ring signature; and (d) submitting the negative report about the second user, which has been signed with the ring signature, to a publicly accessible database that stores reputation information for users of the VR environment;

wherein because the negative report about the second user, as submitted to the publicly accessible database is signed with the ring signature, the second user cannot determine from the publicly accessible database that the first user generated the negative report.

17. The one or more processor readable storage devices of claim 16, wherein:

each of the users is associated with a respective public key and a respective private key; and the ring signature is computed using the public keys of the group of the users associated with avatars that are within the portion of the VR environment.

18. The one or more processor readable storage devices of claim 16, wherein the method further comprises:

determining whether the first and second avatars were both in a same portion of the VR environment when the negative report about the second user was generated by the first user;

allowing the negative report about the second user to be signed with the ring signature and submitted to the publicly accessible database, in response to determining that the first and second avatars were both in the same portion of the VR environment when the negative report about the second user was generated by the first user; and preventing the negative report about the second user from being signed with the ring signature and submitted to the publicly accessible database, in response to determining that the first and second avatars, controlled respectively by the first and second users, were not both in the same portion of the VR environment when the negative report about the second user was generated by the first user.

19. The one or more processor readable storage devices of claim 16, wherein the negative report about the second user that is generated by the first user is used to adjust a reputation score of the second user that is made available to other users.

20. A server for supporting a computer implemented virtual reality (VR) environment in which users of the VR environment can explore the VR environment and interact with one another within the VR environment using client computing devices that are being used by the users, the server comprising:

one or more processors of the server configured to compute ring signature for a group of the users associated with avatars that are within a portion of the VR environment;

a network interface of the server configured to receive a negative report that a first user controlling a first avatar within a portion of the VR environment generated about a second user controlling a second avatar within the portion of the VR environment;

the one or more processor of the server also configured to sign the negative report about the second user with the ring signature, and submit the negative report about the second user, which has been signed with the ring signature, to a publicly accessible database that stores reputation information for users of the VR environment;

wherein because the negative report about the second user, as submitted to the publicly accessible database is signed with the ring signature, the second user cannot determine from the publicly accessible database that the first user generated the negative report.

* * * * *